United States Patent
Wang (10) Patent No.: US 7,700,889 B2
(45) Date of Patent: Apr. 20, 2010

(54) DOUBLE-SHOT MOLDED BUTTON AND METHOD FOR MAKING THE SAME

(75) Inventor: Min Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 61 days.

(21) Appl. No.: 11/967,011

(22) Filed: Dec. 29, 2007

(65) Prior Publication Data

US 2009/0038926 A1    Feb. 12, 2009

(30) Foreign Application Priority Data

Aug. 6, 2007    (CN) .................. 2007 1 0201288

(51) Int. Cl.
*H01H 3/12* (2006.01)
(52) U.S. Cl. ....................... 200/345; 200/341
(58) Field of Classification Search ......... 200/310–314, 200/341–345, 61.54, 339
See application file for complete search history.

(56) References Cited

U.S. PATENT DOCUMENTS

| 5,713,458 | A  | * | 2/1998  | Johnson et al. | 200/314 |
| 5,993,019 | A  | * | 11/1999 | Kline et al.   | 362/29  |
| 6,205,650 | B1 | * | 3/2001  | Enoch et al.   | 29/622  |
| 6,365,855 | B1 | * | 4/2002  | Sutter et al.  | 200/314 |
| 6,737,596 | B1 | * | 5/2004  | Hein           | 200/310 |
| 7,094,979 | B2 | * | 8/2006  | Kurokawa et al.| 200/5 R |
| 7,135,650 | B2 | * | 11/2006 | Jung           | 200/314 |
| 7,250,578 | B2 | * | 7/2007  | Mullard et al. | 200/61.54 |
| 7,564,002 | B2 | * | 7/2009  | Watanabe       | 200/344 |

* cited by examiner

*Primary Examiner*—Renee S Luebke
*Assistant Examiner*—Lisa Klaus
(74) *Attorney, Agent, or Firm*—Frank R. Niranjan (57) ABSTRACT

A double-shot molded button includes a main portion including an operation surface and at least one inserted portion embedded in the main portion. The inserted portion includes an exposed surface exposed from the operation surface to configure a symbol for denoting an operation function and being pressed. An orthographic projection image of the inserted portion on the exposed surface is enclosed within the exposed surface. A method for making the double-shot molded button is also provided.

7 Claims, 8 Drawing Sheets

DOUBLE-SHOT MOLDED BUTTON AND METHOD FOR MAKING THE SAME

BACKGROUND OF THE INVENTION

1. Field of the Invention

The present invention relates, generally, to buttons, and particularly, to a double-shot molded button, and a method for making the double-shot molded button.

2. Discussion of the Related Art

In order to control electronic devices such as media players and mobile phones, control buttons bearing graphic symbols such as letters, numbers and other symbols are widely used. The specific graphic symbols define corresponding functions of the control buttons. The buttons are typically made by a double-shot molding technology. A melted opaque material is first injected into a mold to form a base part containing a symbol. A melted translucent material is then injected to surround the symbol.

Figure 7:
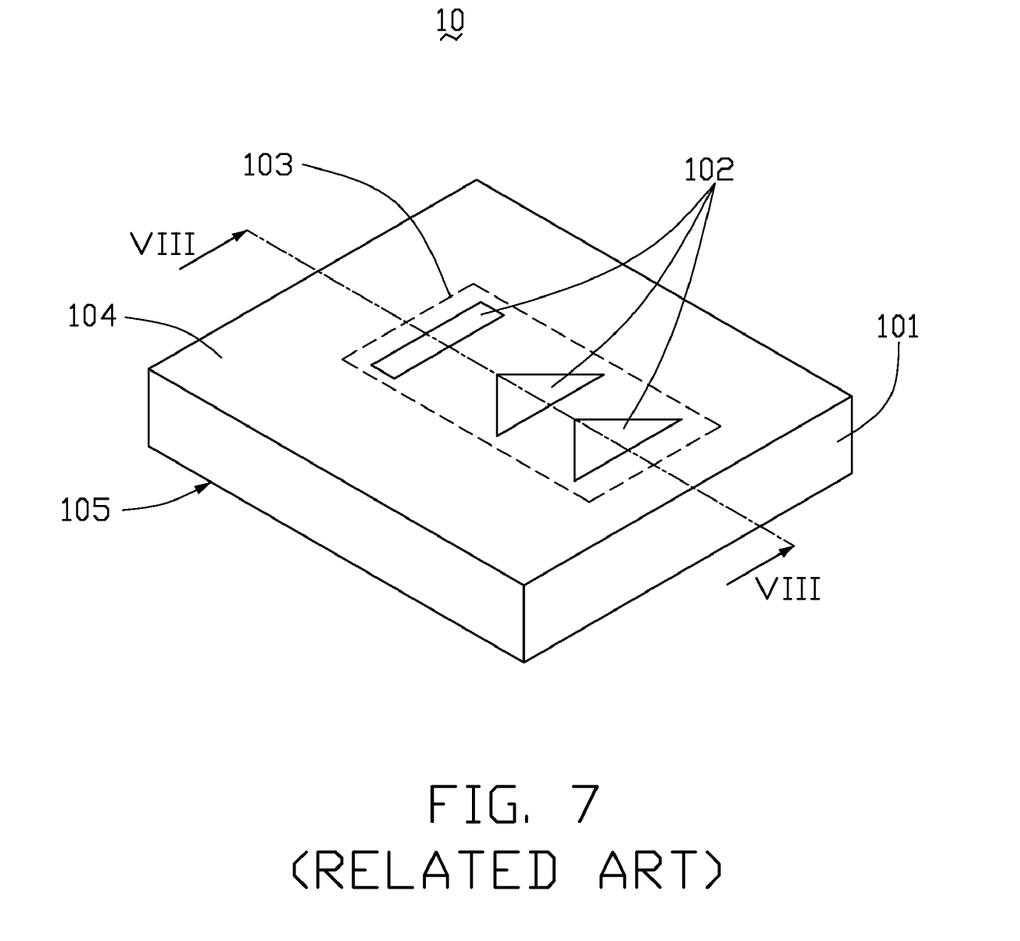
FIG. 7 is an isometric view of a general double-shot molded button.
Figure 8:
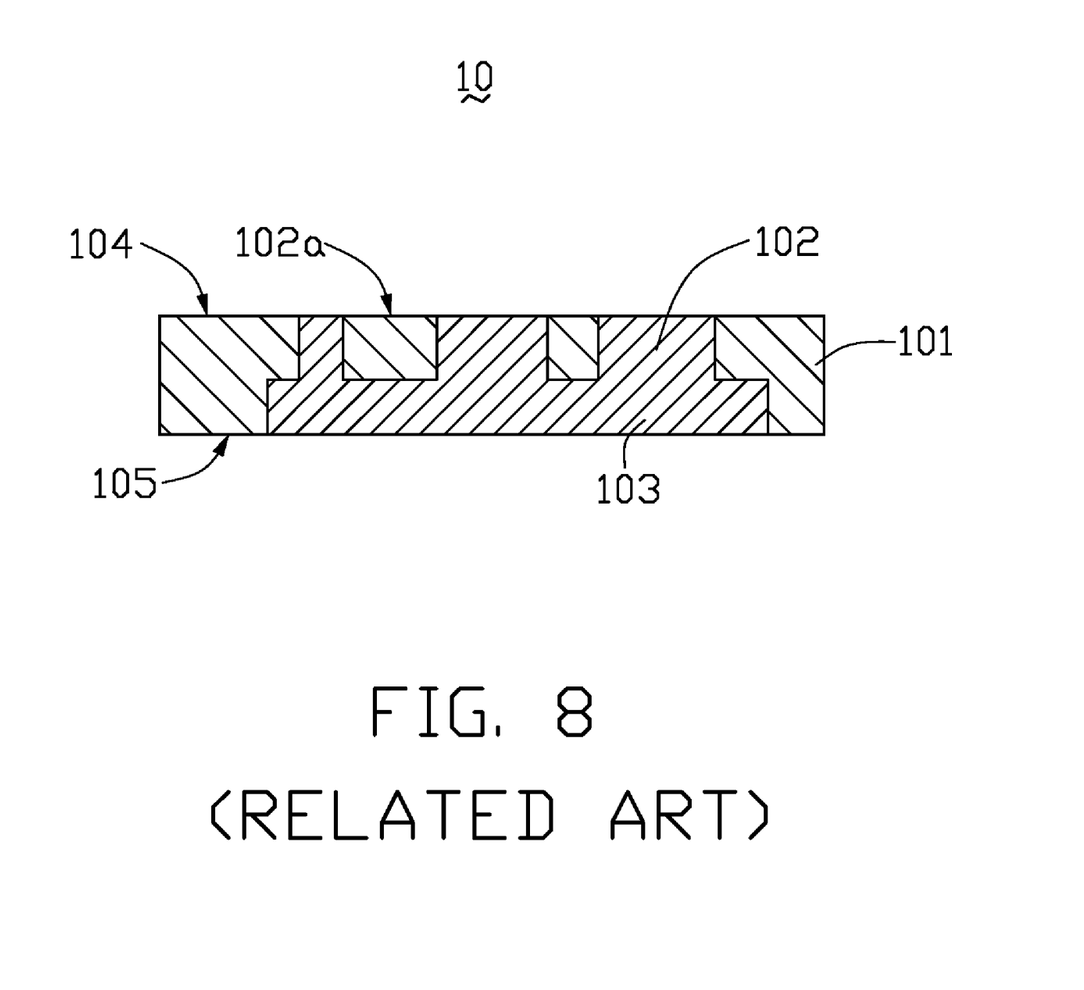
FIG. 8 is a cross-sectional view of the double-shot molded button of FIG. 7, taken along line VIII-VIII thereof.

Referring to FIGS. 7 and 8 together, a typical double-shot molded button 10 is illustrated. The button 10 includes a main portion 101, an inserted portion 102, and a base portion 103 supporting the inserted portion 102. The main portion 101 includes an operation surface 104 and a bottom surface 105 opposite to the operation surface 104. The inserted portion 102 and the base portion 103 are integrally formed and embedded in the main portion 101. The inserted portion 102 protrudes from the base portion 103 to the operation surface 104 of the main portion 101. The inserted portion 102 has several distal ends 102a opposite to the base portion 103 exposed to align with the operation surface 104 such that specific symbols are constructed to define a specific function. A user can thus operate a certain button 10 selected according to the specific symbol to carry out a desired operation.

However, to accommodate thinner electronic devices, the button 10 is designed thinner, a projection image of the base portion 103 is visible on the operation surface 104 of the main portion 101. In addition, if the main portion 101 is made of translucent materials, the projection image can be also seen on the operation surface 104 of the main portion 101. Therefore, boundaries that the operation surface 104 surrounds the distal ends 102a of the inserted portion 102 would be blurred by the projection image of the base portion 103.

What is needed, therefore, is a double-shot molded button that overcomes the above mentioned disadvantages. A method for making the double-shot molded button is also desired.

SUMMARY

In one aspect, a double-shot molded button according to a preferred embodiment includes a main portion including an operation surface and at least one inserted portion embedded in the main portion. The inserted portion includes an exposed surface exposed from the operation surface to configure a symbol for denoting an operation function. An orthographic projection image of the inserted portion on the exposed surface is enclosed within the exposed surface.

In another aspect, a method for making a double-shot molded button includes: injecting a first material into a first mold to form at least one inserted portion; placing the inserted portion into a second mold; and injecting a second material into the second mold to form a main portion, the main portion surrounding the inserted portion.

Other advantages and novel features will become more apparent from the following detailed description of the preferred embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present double-shot molded button and method for making the double-shot molded button. Moreover, in the drawings, like reference numerals designate corresponding parts throughout the several views, and all the views are schematic.

DETAILED DESCRIPTION OF THE PREFERRED EMBODIMENTS

Reference will now be made to the drawings to describe preferred embodiments of the present double-shot molded button and a method for making the double-shot molded button, in detail.

Figure 1:
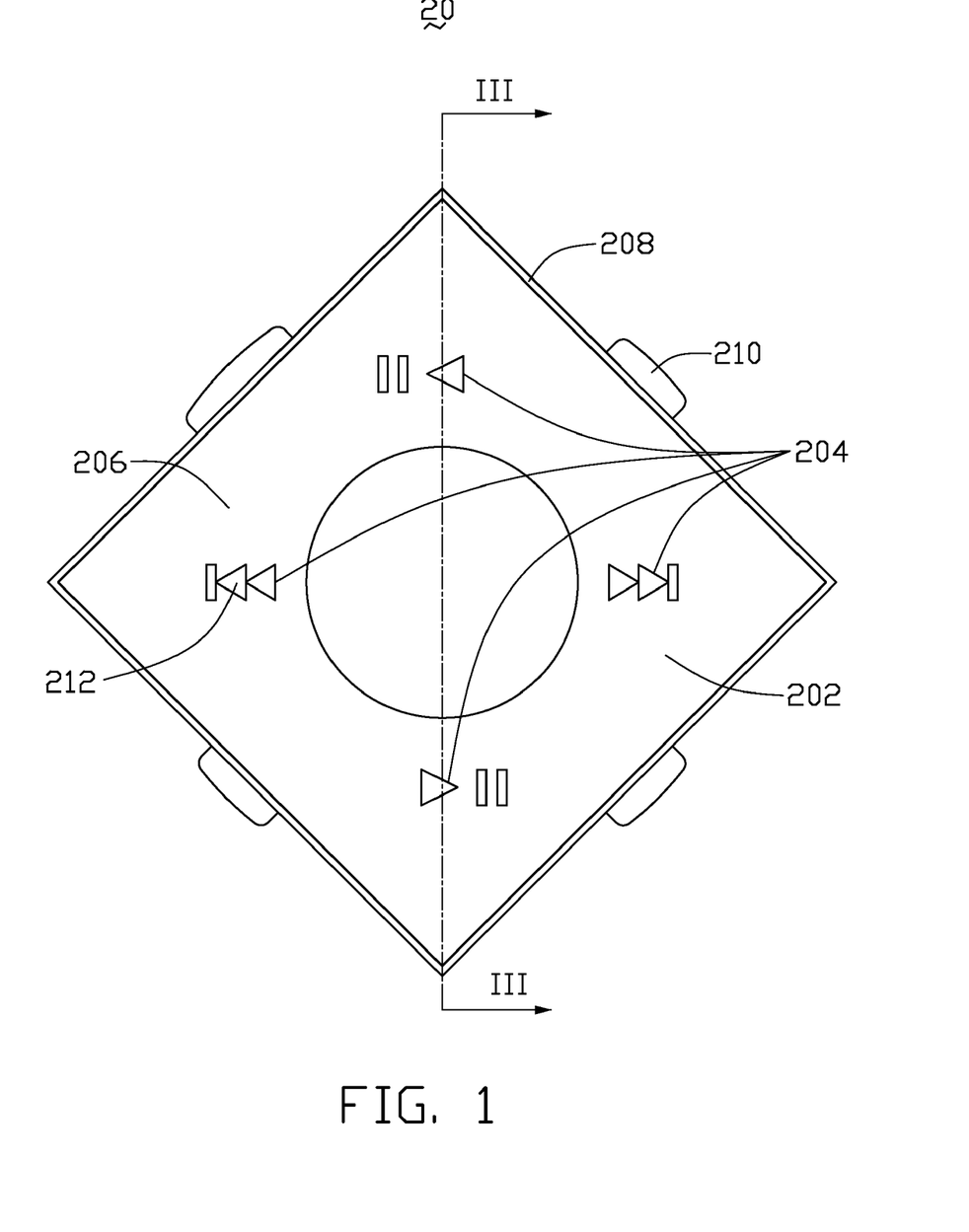
FIG. 1 is a schematic, top view of a double-shot molded button in accordance with a first preferred embodiment of the present invention.
Figure 2:
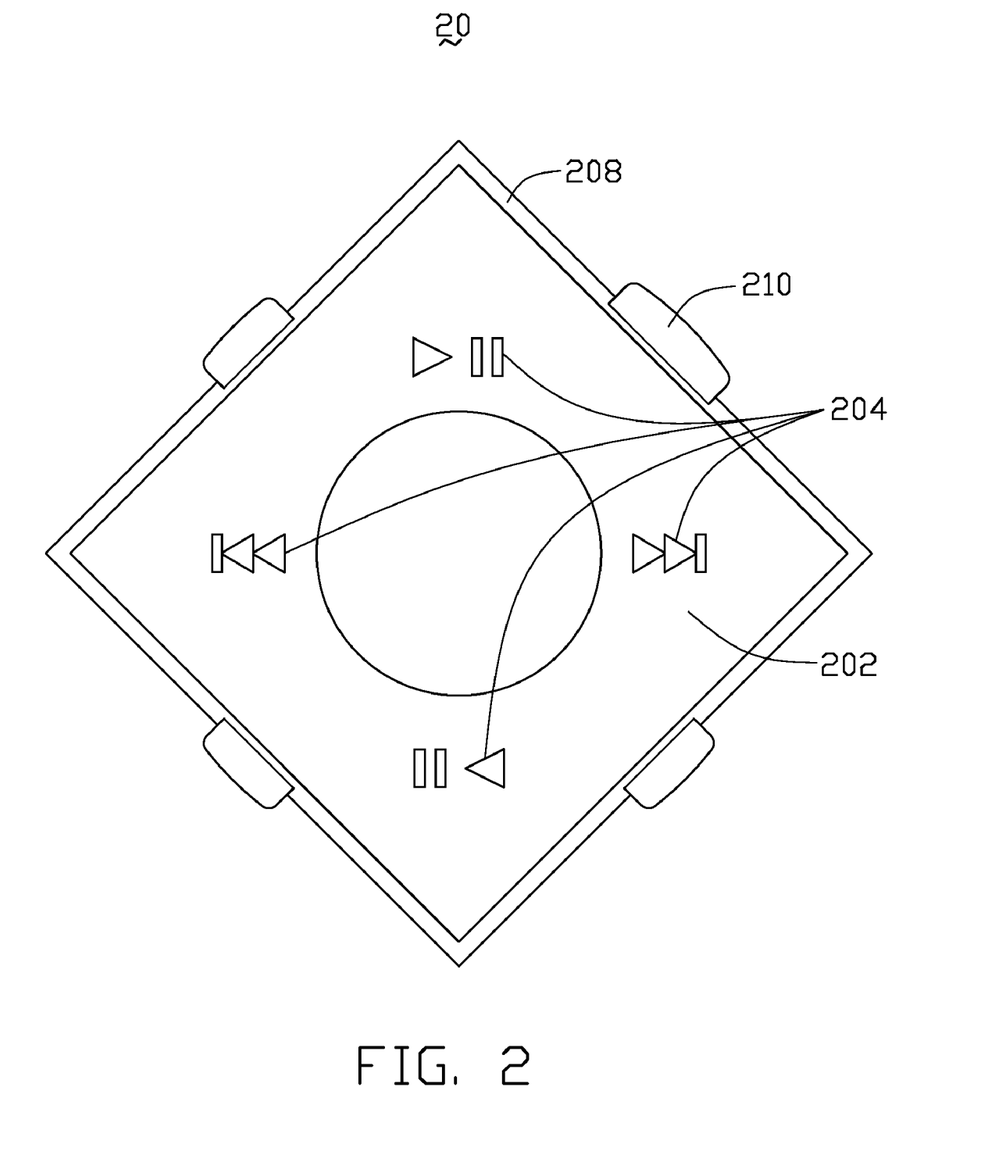
FIG. 2 is a schematic, bottom view of the double-shot molded button of FIG. 1.
Figure 3:
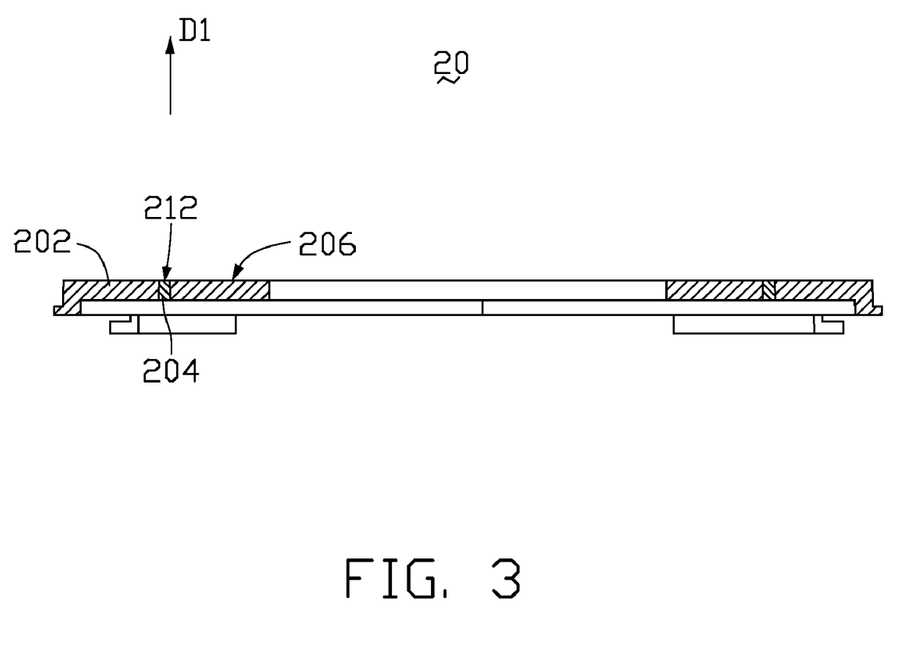
FIG. 3 is a cross-sectional view of the double-shot molded button of FIG. 1, taken along line III-III thereof.

Referring to FIGS. 1 through 3, a double-shot molded button 20 in accordance with a first preferred embodiment of the present invention is illustrated. The double-shot molded button 20 can be employed in an electronic device (not shown).

The button 20 includes a main portion 202, and a plurality of inserted portions 204 embedded in the main portion 202. The main portion 202 and the inserted portions 204 are made of different materials. In the first embodiment, the main portion 202 is made of a translucent material, and the inserted portions 204 are made of opaque materials. The main portion 202 includes an operation surface 206. A rim portion 208 extends around the edges of the main portion 202. Four brackets 210 extend from the four edges of the rim portion 208 correspondingly. The rim portion 208 and the brackets 210 are configured to securely attach the main portion 202 onto the electronic device. Each of the inserted portions 204 extends through the main portion 202, and includes an exposed surface 212 exposed at the operation surface 206 of the main portion 202. The exposed surface 212 forms a symbol to indicate a corresponding operation function (e.g. play, pause, stop, return etc.). A cross-sectional figure of the inserted portion 204 is a quadrate shape, as shown in FIG. 3. An orthographic projection image of the inserted portion 204 towards the exposed surface 212 is located within the exposed surface 212. In other words, a projection image of the inserted portion 204 that is cast along an orthographic projection direction D1 onto the exposed surface 212 is covered by the exposed surface 212. Therefore, boundaries that the operation surface 206 surrounds the exposed surface 212 of the inserted portion 204 would not be blurred by the projection image of the base portion inserted portion 204.

Figure 4:
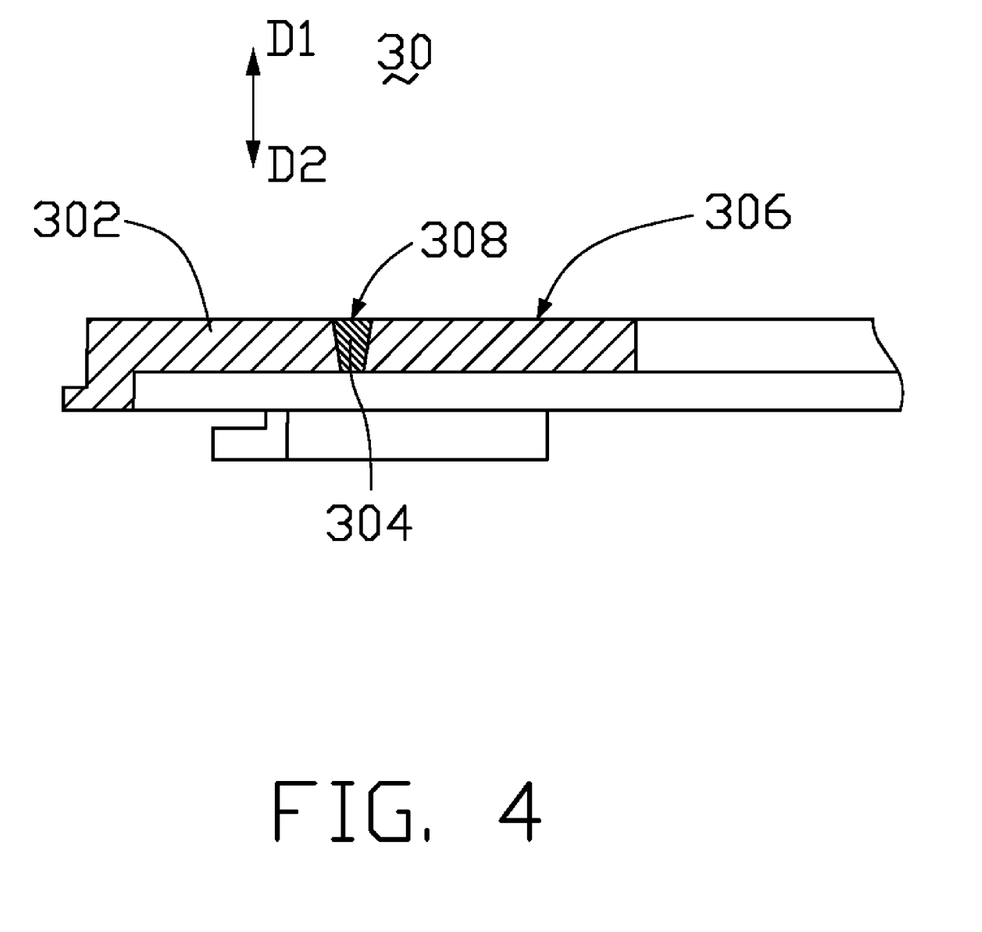
FIG. 4 is a partial cross-sectional view of the double-shot molded button in accordance with a second preferred embodiment of the present invention.

Referring to FIG. 4, a double-shot molded button 30 in accordance with a second embodiment of the present invention is illustrated. The button 30 includes a main portion 302, a plurality of inserted portions 304 embedded in the main portion 302. The main portion 302 includes an operation surface 306. The inserted portion 304 includes an exposed surface 308 surrounded by the operation surface 306. A cross-section of the inserted portion 304 is a trapezoid shape and the exposed surface 308 of the inserted portion 304 is a larger size top surface of the trapezoid. Thus, an orthographic projection image of the inserted portion 304 on the exposed surface 308 is located within the exposed surface 308. A projection image of the inserted portion 304 is covered by the exposed surface 308. Therefore, boundaries that the operation surface 306 surrounds the exposed surface 308 of the inserted portion 304 would not be blurred by the projection image of the base portion inserted portion 304. In addition, the inserted portion 304 can thus be firmly retained in the main portion 302 when the exposed surface 308 is pressed along a direction D2 that is opposite to an orthographic projection direction D1, because the inserted portion 304 has a trapezoid shaped cross-section.

Figure 5:
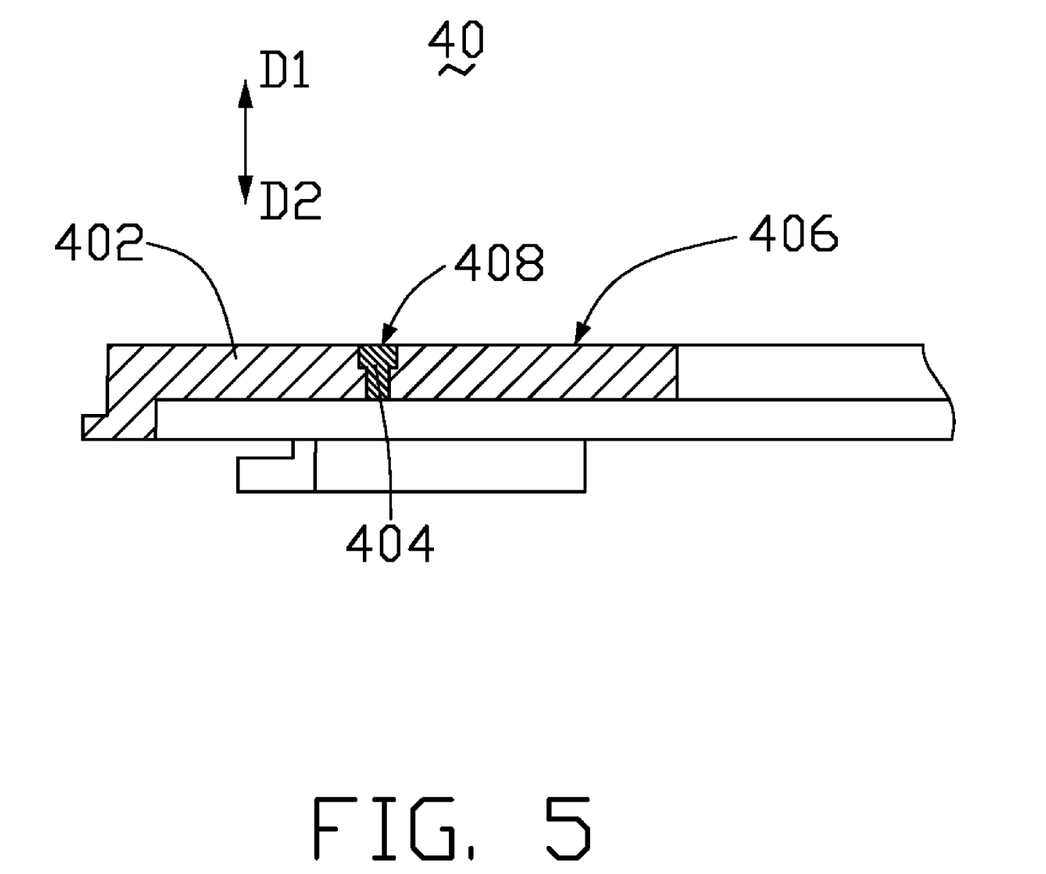
FIG. 5 is a partial cross-section view of the double-shot molded button in accordance with a third preferred embodiment of the present invention.

Referring to FIG. 5, a double-shot molded button 40 in accordance with a third embodiment of the present invention is illustrated. The button 40 includes a main portion 402, a plurality of inserted portions 404 embedded in the main portion 402. The main portion 402 includes an operation surface 406. The inserted portion 404 includes an exposed surface 408 surrounded by the operation surface 406. A longitudinal cross-section of the inserted portion 404 is T-shaped and the exposed surface 408 is a top surface of the inserted portion 404. An orthographic projection image of the inserted portion 404 on the exposed surface 408 is located within the exposed surface 408, therefore, a projection image of the inserted portion 404 is covered by the exposed surface 408. Boundaries that the operation surface 406 surrounds the exposed surface 408 of the inserted portion 404 would not be blurred by the projection image of the inserted portion 404. In addition, the inserted portion 404 can thus be firmly retained in the main portion 402 when the exposed surface 408 is pressed along a direction D2 that is opposite to an orthographic projection direction D1, because the inserted portion 404 has a stepped-shaped cross-section.

Figure 6:
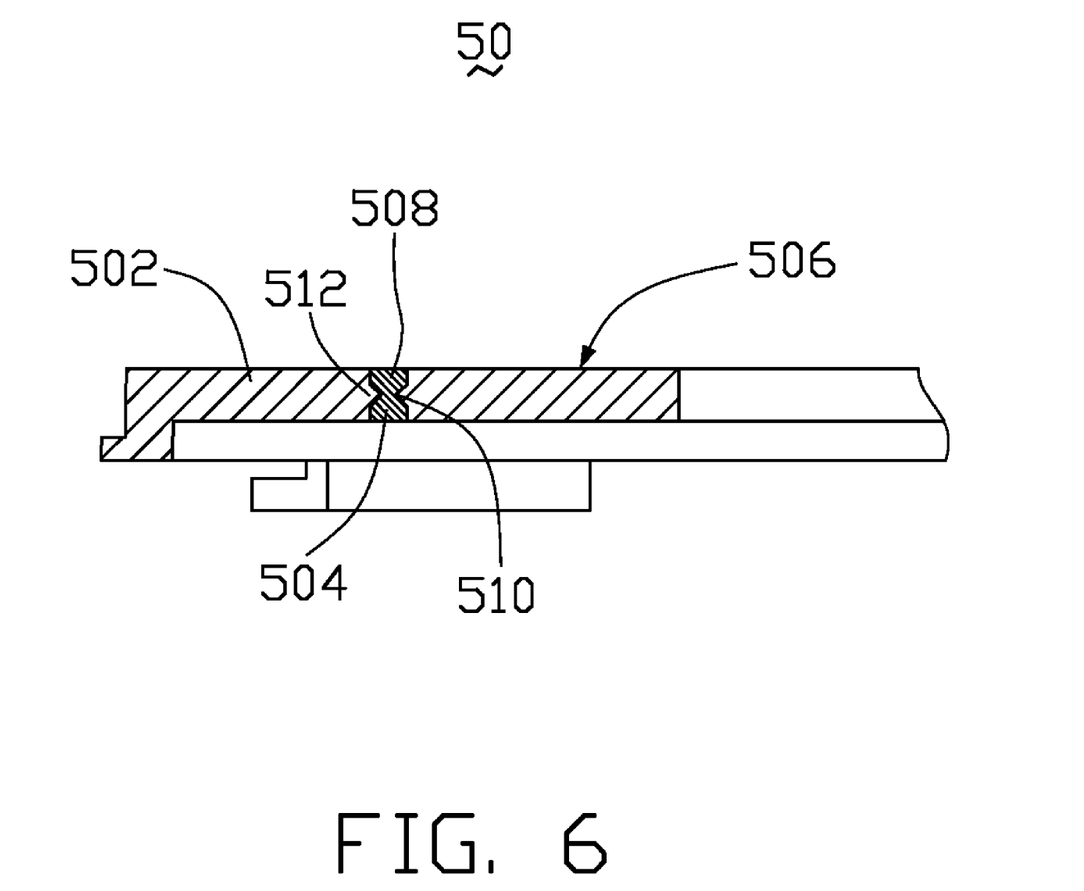
FIG. 6 is a partial cross-section view of the double-shot molded button in accordance with a fourth preferred embodiment of the present invention.

Referring to FIG. 6, a double-shot molded button 50 in accordance with a fourth embodiment of the present invention is illustrated. The button 50 includes a main portion 502, a plurality of inserted portions 504 embedded in the main portion 502. The main portion 502 includes an operation surface 506. The inserted portion 504 includes an exposed surface 508 surrounded by the operation surface 506. The exposed surface 508 is configured for being pressed. An orthographic projection image of the inserted portion 504 on the exposed surface 508 is located within the exposed surface 508, therefore, a projection image of the inserted portion 504 is covered by the exposed surface 508. Boundaries that the operation surface 506 marches with the exposed surface 508 of the inserted portion 504 would not be blurred by the projection image of the inserted portion 504. In addition, the inserted portion 504 is a cylinder, and a groove 510 is defined around the cylinder. The main portion 502 forms a protrusion 512 engaged in the groove 510. The inserted portion 504 can thus be firmly retained in the main portion 502. When the exposed surface 508 is pressed along the direction D2 that is opposite to the orthographic projection direction D1, detachment of the inserted portion 504 from the main portion 502 is prevented.

It should be pointed out that, cross-sectional figures of the inserted portions 204, 304, 404 and 504 can be other shapes.

The methods of making the buttons 30, 40, and 50 are similar to the method of making the button 20. An exemplary method for making the button 20 of FIG. 3 is described below. The button 20 is made by a double-shot molding technology. A melted opaque material is firstly injected into a mold (not shown) to form the inserted portion 204 containing a symbol. The inserted portion 204 is then placed into a second mold (not shown). A melted translucent material is secondly injected to surround the inserted portion 204 to form the main portion 202. The projection image of the inserted portion 204 can not be seen from the direction D2 even if the button 20 is made slim or the main portion 202 is made of translucent material. A good outlook of the button 20 without projection image effects can be achieved.

Finally, while the present invention has been described with reference to particular embodiments, the description is illustrative of the invention and is not to be construed as limiting the invention. Therefore, various modifications can be made to the embodiments by those skilled in the art without departing from the true spirit and scope of the invention as defined by the appended claims.

What is claimed is:

1. A double-shot molded button, comprising:
   a main portion including an operation surface; and
   at least one inserted portion embedded in the main portion, the inserted portion including an exposed surface exposed from the operation surface to configure a symbol for denoting an operation function, an orthographic projection image of the inserted portion on the exposed surface being within the exposed surface, wherein the inserted portion defines at least one groove therearound, the main portion comprises at least one protrusion engaging in the corresponding groove.

2. The double-shot molded button as claimed in claim 1, wherein the main portion and the inserted portion are respectively made of different materials and integrally formed.

3. The double-shot molded button as claimed in claim 2, wherein the main portion is made of transparent material.

4. The double-shot molded button as claimed in claim 2, wherein the inserted portion is made of opaque material.

5. The double-shot molded button as claimed in claim 1, wherein the main portion comprises a rim portion extending around edges thereof, the rim portion is configured for securing the button.

6. The double-shot molded button as claimed in claim 5, wherein the main portion comprises a plurality of brackets extend from the rim portion for mounting the button.

7. The double-shot molded button as claimed in claim 1, wherein the inserted portion has one of following cross-section: rectangle, trapezoid, and T-shape.

* * * * *